United States Patent
Tower

(10) Patent No.: US 10,030,619 B2
(45) Date of Patent: Jul. 24, 2018

(54) CONNECTOR FOR MOUNTING SENSOR IN PRESSURIZED FLUID SYSTEM

(71) Applicant: Caterpillar Inc., Peoria, IL (US)

(72) Inventor: Benjamin Tower, Varna, IL (US)

(73) Assignee: Caterpillar Inc., Deerfield, IL (US)

( * ) Notice: Subject to any disclaimer, the term of this patent is extended or adjusted under 35 U.S.C. 154(b) by 202 days.

(21) Appl. No.: 15/204,963

(22) Filed: Jul. 7, 2016

(65) Prior Publication Data

US 2018/0010560 A1  Jan. 11, 2018

(51) Int. Cl.
  *F02M 37/00* (2006.01)
  *F16L 55/07* (2006.01)
  *F02M 55/02* (2006.01)
  *F02M 55/00* (2006.01)

(52) U.S. Cl.
  CPC ...... *F02M 37/0017* (2013.01); *F02M 55/002* (2013.01); *F02M 55/025* (2013.01); *F16L 55/07* (2013.01)

(58) Field of Classification Search
  CPC ............. F02M 37/0017; F02M 55/025; F02M 55/002; F16L 55/07
  See application file for complete search history.

(56) References Cited

U.S. PATENT DOCUMENTS

| | | | |
|---|---|---|---|
| 6,886,537 B2 | 5/2005 | Kondo | |
| 7,040,149 B2 | 5/2006 | Brock | |
| 7,125,051 B2 * | 10/2006 | Usui | F02M 55/004 285/197 |
| 7,246,601 B2 | 7/2007 | Yamamoto | |
| 7,275,521 B2 * | 10/2007 | Usui | F02M 55/005 123/468 |
| 7,296,474 B2 * | 11/2007 | Shamine | F02M 55/004 73/40 |
| 7,568,736 B2 * | 8/2009 | Asada | F02M 55/005 285/125.1 |
| 7,775,102 B2 | 8/2010 | Haerer | |
| 2004/0149023 A1 * | 8/2004 | Lecea | F02D 19/0628 73/114.39 |
| 2011/0023831 A1 * | 2/2011 | Klesse | F02M 55/025 123/447 |
| 2012/0006297 A1 * | 1/2012 | Worthington | F02M 37/0052 123/456 |

FOREIGN PATENT DOCUMENTS

| | | |
|---|---|---|
| CN | 202468115 | 10/2012 |
| CN | 203285591 | 11/2013 |
| EP | 1203154 | 5/2002 |
| JP | 2002364488 | 12/2002 |
| JP | 2003227438 | 8/2003 |
| JP | 2015068217 | 4/2015 |

* cited by examiner

*Primary Examiner* — Hung Q Nguyen
*Assistant Examiner* — Xiao Mo
(74) *Attorney, Agent, or Firm* — Mattingly Burke Cohen & Biederman

(57) ABSTRACT

A connector for mounting a sensor such as a pressure sensor in a fuel system includes a connector body and a tube body. The tube body has sealing surfaces at opposite axial ends that are structured to bias rotation of the connector body and the tube body to occur relative to one another rather than the connector body causing the tube body to rotate against a housing of a fluid reservoir in the system. Deformation of the housing is limited by way of the biasing of rotation.

20 Claims, 4 Drawing Sheets

CONNECTOR FOR MOUNTING SENSOR IN PRESSURIZED FLUID SYSTEM

TECHNICAL FIELD

The present disclosure relates generally to sensor mounting hardware in a pressurized fluid system, and more particularly to a connector having a tube body structured for positioning between a rotatable connector body and a housing of a fluid reservoir.

BACKGROUND

Systems for supplying, distributing and handling pressurized fluids are widespread, particularly in the context of manufacturing, machinery, internal combustion engines, and related systems. In an engine, a pressurized fluid system is often used for delivering combustible fuel to individual cylinders. It has been discovered that relatively high pressures of the fuel can assist in atomization of fuel spray to various ends, notably efficiency and reduction of certain emissions. The mechanisms used for initially pressurizing the fuel, distributing the fuel to fuel injectors, and generally containing fuel at any point in the system under relatively high pressures tend to be relatively sophisticated. Fuel pressures can be in excess of 300 MPa. It is also generally desirable to maintain fuel pressure for fuel injection within a relatively narrow range for controllability and predictability of operation.

Decades ago engineers developed a fuel system known as a common rail design where a fluid reservoir is maintained at or close to a desired pressure, A plurality of individual fuel injectors fluidly connected to the common rail can be supplied with the fuel at rail pressure and selectively operated to effect fuel injections. In more recent years, a variation on the common rail design was developed where a plurality of separate fuel accumulators are positioned fluidly between a common rail and each of a plurality of fuel injectors. The plurality of accumulators are coupled together in a so-called daisy chain arrangement.

In any of these and many other pressurized fluid systems, it is desirable to monitor a pressure of the pressurized fluid so that adjustments can be made to compensate for reductions in pressure occurring when pressurized fluid is removed from the system, such as by way of a fuel injection, and for other purposes. Commonly owned U.S. Pat. No. 7,296,474 to Shamine is directed to a fluid sensor having a low-pressure drain. In Shamine, a sensor has a sensor body enclosing a sensor element that senses a parameter of a pressurized fluid. A passageway fluidly communicates the sensor element with the pressurized fluid. A second passageway allows fluid that has leaked past a sealing surface to drain to a tank. Shamine is one example of a sensor connecting or mounting arrangement where leaks or seal failures are handled by providing a drain path between double "walls" of a housing or reservoir of the pressurized fluid system. A number of jurisdictions require "double-walled" fluid containment for certain types of fluids, notably combustible fluids such as fuel. Typical applications where a double-walled design is necessary or desirable include offshore oil or gas platforms and the like, and various other marine applications. While Shamine may work well for its intended purposes, there is always room for improvement.

SUMMARY OF THE INVENTION

In one aspect, a pressurized fluid system includes a supply of pressurized fluid, and a common rail fluidly connected to the supply of pressurized fluid. A plurality of fluid conduits each include a housing defining a fluid inlet in fluid communication with the common rail, a fluid outlet, and a fluid reservoir extending between the fluid inlet and the fluid outlet. At least one of the housings includes a connector having a first set of threads. The system further includes a connector having a connector body and a tube body positioned within the connector body, the connector body including a second set of threads rotated into engagement with the first set of threads such that the tube body is clamped between the housing and the connector body to form a first seal against the connector body and a second seal against the housing. A sensing mechanism is coupled with the connector and forms a third seal with the connector body. The connector further defines a high-pressure fluid passage extending through the connector body and the tube body and fluidly connecting the corresponding fluid reservoir with the sensing mechanism, and a low-pressure space structured to drain a fluid leaked from the high-pressure passage past either of the first seal or the second seal.

In another aspect, a connector for mounting a sensor in a pressurized fluid system includes a connector body defining a longitudinal center axis extending between a first axial connector body end having a first bore formed therein and a second axial connector body end having a second bore formed therein. The connector body further includes an internal dividing wall positioned axially between the first bore and the second bore, and a set of threads structured to engage another set of threads in a housing of fluid reservoir for clamping the connector to the housing. The connector further includes a tube body coaxially arranged with the connector body within the second bore, and including a first axial tube body end having a first sealing surface structured to form a first seal against the internal dividing wall, and a second axial tube body end having a second sealing surface structured to form a second seal against the housing of the fluid reservoir. The connector further includes a high-pressure fluid passage for fluidly connecting the fluid reservoir with a sensor mechanism positioned within the first floor, and including a first segment formed in the connector body and extending through the inner dividing wall between the first bore and the second bore, and a second segment formed in a tube body and extending between the first axial tube body end and the second axial tube body end. The connector further includes a low-pressure fluid space formed in the connector body and in fluid communication with each of the first bore and the second bore, for draining a fluid leaked from the high-pressure fluid passage.

In still another aspect, a method of coupling a sensing mechanism with a fluid reservoir in a pressurized fluid system includes rotating a connector for mounting the sensing mechanism relative to the housing of the fluid reservoir to engage a set of threads of a connector body of the connector with a set of threads of the housing. The method further includes clamping the connector to the housing by way of the engagement of the sets of threads, such that a tube body of the connector forms a first seal against the connector body and a second seal against the housing and establishes a passage for communicating a fluid pressure of the fluid reservoir to the sensing mechanism. The method further includes rotating the connector body against the tube body during the clamping so as to limit rotation of the tube body against the housing, and limiting deformation of the housing caused by the clamping by way of the limiting of rotation of the tube body.

DETAILED DESCRIPTION

Figure 1:
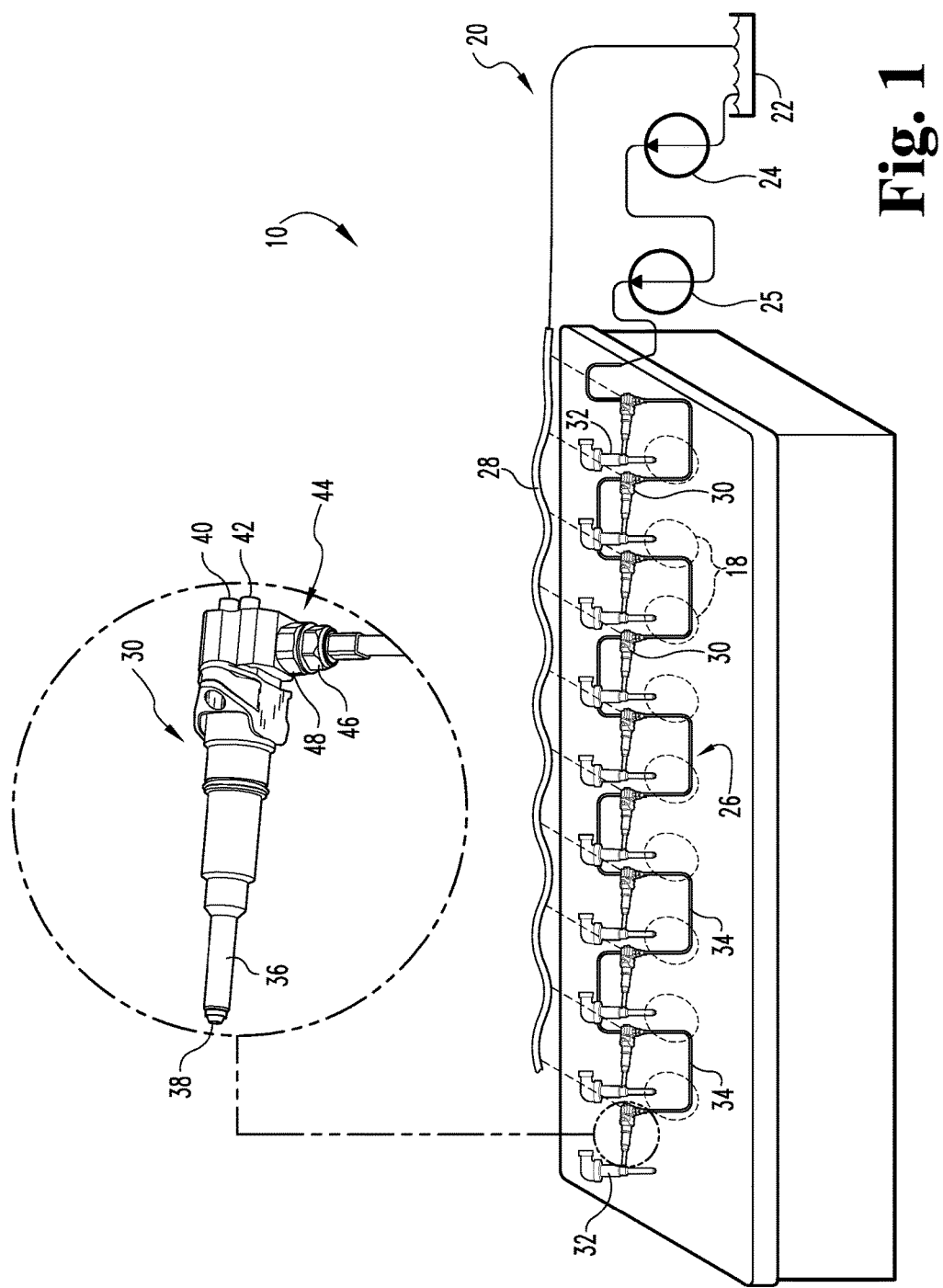
FIG. 1 is a diagrammatic view of an engine system, including a detailed enlargement, according to one embodiment.

Referring to FIG. 1, there is shown an engine system 10 according to one embodiment, and including an engine 12 having an engine housing 14 coupled with a cylinder head 16. A plurality of cylinders 18 may be formed within engine housing 14. Engine system 10 may include a compression ignition diesel engine system, suitable for marine applications or power generation, pump or compressor operation, or another purpose in an offshore environment. The present disclosure is not thereby limited to any particular environment, fuel type, engine type, or even to the engine system and fuel system fields at all, as will be further apparent from the following description.

Engine system 10 further includes a pressurized fluid system which may be a fuel system 20 where a fuel transfer pump 24 is coupled with a fuel tank 22. A high-pressure pump 25 services as a supply of pressurized fuel, and is coupled with fuel transfer pump 24. Those skilled in the art will be familiar with the provision of a relatively low-pressure transfer pump and a high-pressure pump, which may have a variable displacement for example. Fuel system 20 may further include a pressurized common rail 26 fluidly connected to high-pressure pump 25, and including a plurality of separate fluid segments 34. Segments 34 each extend between a plurality of fluid conduits in the form, for example, of accumulators 30. Each accumulator 30 includes a housing 36 and is structured to contain a volume of pressurized fuel and supply the same to a plurality of fluid delivery devices in the nature of fuel injectors 32. Each of fuel injectors 32 is coupled with one accumulator 30 in the illustrated embodiment. Fuel injectors 32 may each be positioned partially within a corresponding one of cylinders 18, such that engine 12 is a direct injection engine. In other embodiments, a different design might be used. Fuel system 20 may further include a low-pressure common drain line 28 fluidly connected with each of accumulators 30 and each of fuel injectors 32, for purposes which will be apparent from the following description. Fuel system 20 may provide for so-called double-wall containment, in the event of fuel leakage from any of accumulators 30 or fuel injectors 32.

FIG. 1 further includes a detailed enlargement, wherein an accumulator housing 36 is shown which may be typical of or identical to any of a plurality of housings of each of accumulators 30. Each of accumulators 30 define a fluid inlet or high-pressure inlet 40 in fluid communication with common rail 26, a fluid outlet or high-pressure outlet 38 structured to fluidly connect with a corresponding one of fuel injectors 32, and a fluid reservoir extending between the corresponding fluid inlet 40 and fluid outlet 38. At least one of the plurality of accumulators 30, such as the accumulator 30 shown at one end of common rail 26, may be coupled with a sensor and connector assembly 44 that includes a sensor 46 structured to sense a parameter of a fluid within system 20, such as fuel, and a connector 48 that is structured to couple sensor 46 with housing 36 of accumulator 30. In a practical implementation strategy, the sensed parameter includes fluid pressure, and pump 25 can be operated in response to the sensed fluid pressure to maintain a pressure of fluid within common rail 26 within a desired range. In another practical implementation strategy, sensor 46 may be a backup sensor available in the event of failure or degradation of a primary sensor in system 20, although the present disclosure is not thereby limited.

Figure 2:
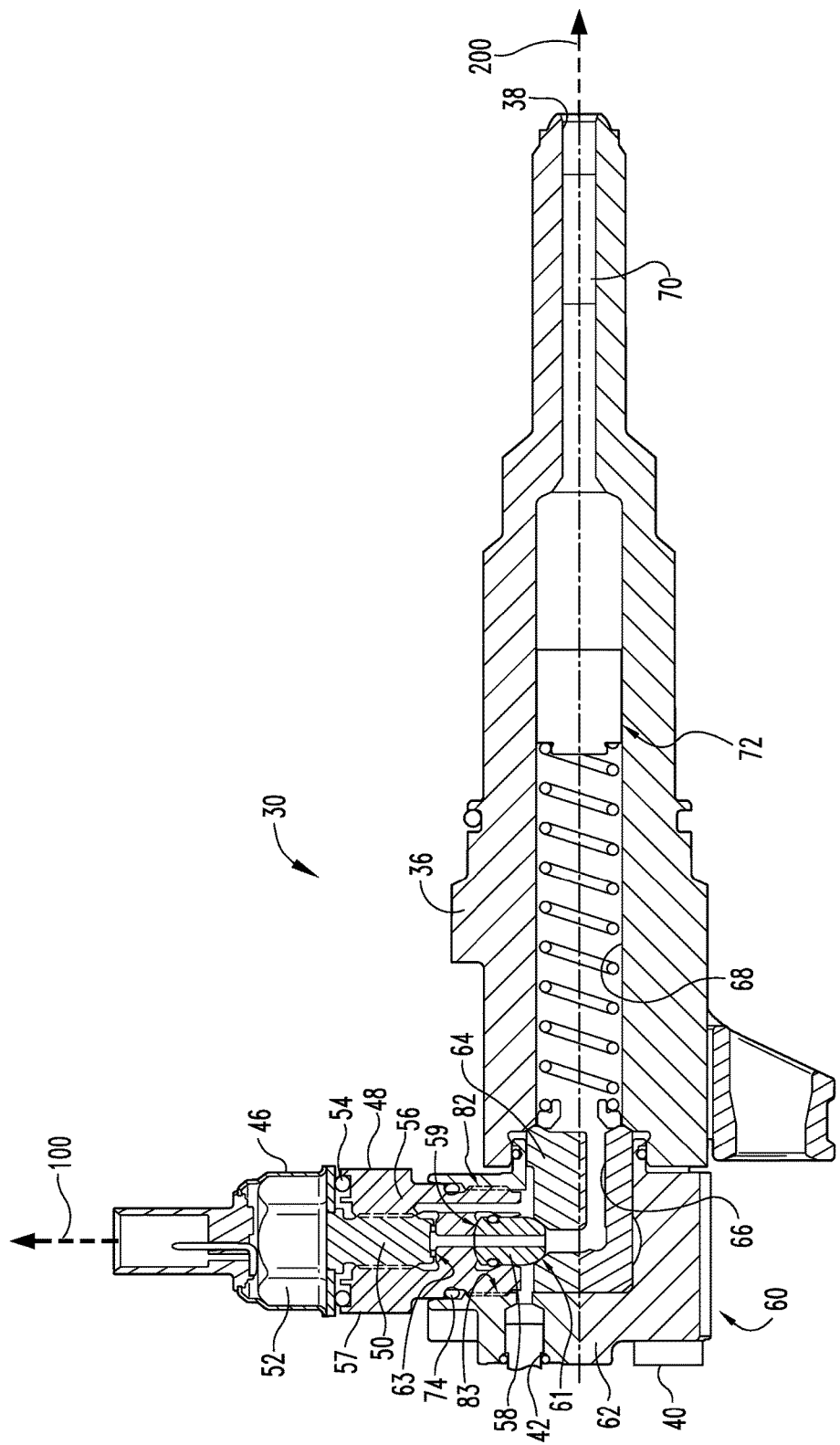
FIG. 2 is a sectioned side diagrammatic view of a portion of the system of FIG. 2.

Referring also now to FIG. 2, there is shown a sectioned side diagrammatic view, in two different section planes, of accumulator 30 coupled with connector 48 and sensor 46. Accumulator 30 includes an accumulator housing 36 as noted above, having a fluid reservoir 68 formed therein, and extending between inlet 40 and outlet 38. A refill control mechanism 72 may be positioned within reservoir 68, and an edge filter 70 may be provided and positioned between outlet 38 and mechanism 72. Accumulator 30 may further include a connector assembly 60 having a first connector piece 62 to which connector 48 is coupled, and a second connector piece 64 having a fluid passage 66 formed therein that communicates between reservoir 68 and connector 48 and sensor 46 as further discussed herein. Sensor 46 may include a sensor housing 52 coupled with a sensing element 50. Sensor 46 can be coupled with connector 48 in any suitable manner, such as by way of mated sets of threads. An O-ring 54 seals between sensor housing 52 and connector 48. Another O-ring 74 seals between connector 48 and connector piece 62.

Figure 3:
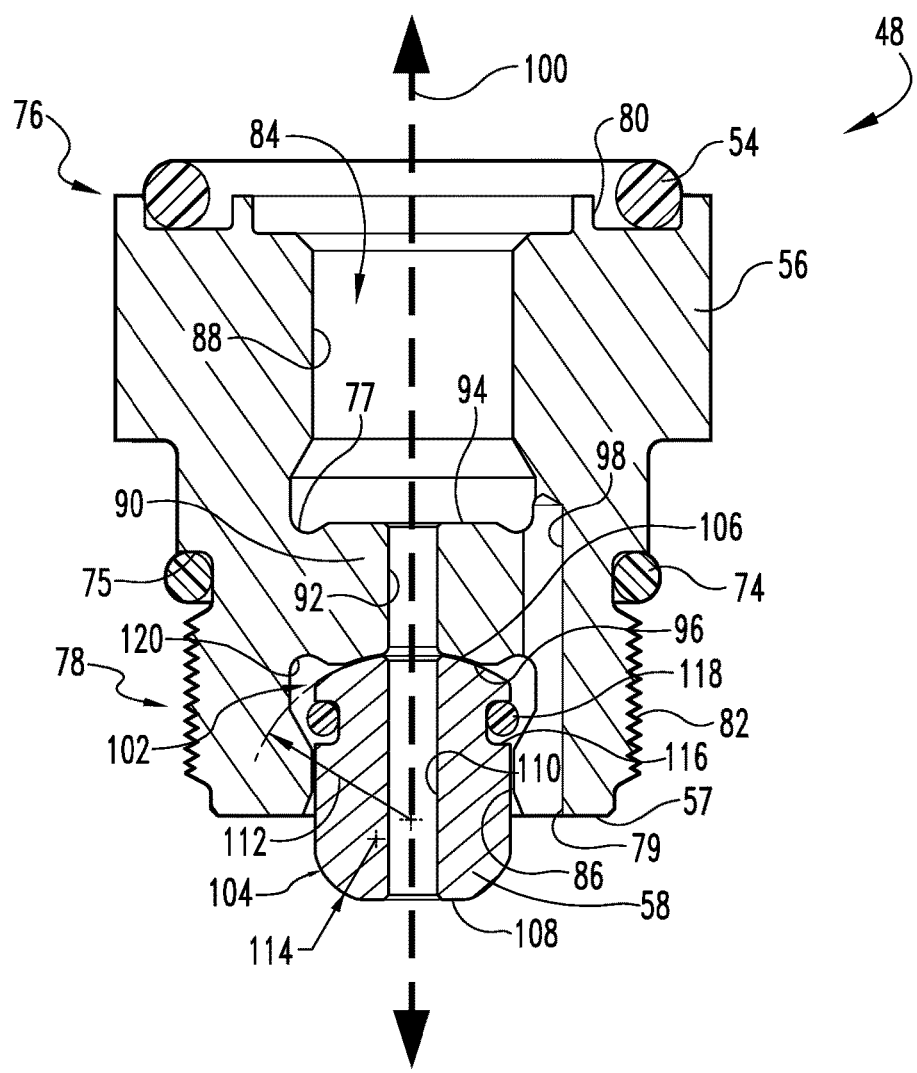
FIG. 3 is a sectioned side diagrammatic view of a connector, according to one embodiment.

Referring also now to FIG. 3, there are shown additional components of connector 48. Connector 48 may include a connector body 56 having an outer surface 57. Outer surface 57 may be shaped to engage with a tool such as a hex wrench for rotating connector body 56 into engagement with housing 36, and in the illustrated case connector piece 64. To this end, connector body 56 may include a first set of threads 82, which can include external threads, and connector piece 64 can include a second set of threads 83, which can include internal threads. Connector body 56 defines a longitudinal center axis 100, that can be oriented approximately normal to axis 200 defined by housing 36 in a practical implementation strategy. Center axis 100 extends between a first axial connector body end 76 and a second axial connector body end 78. First axial connector body end 76 may have a first bore 84 formed therein, and second axial connector body end 76 may have a second bore formed therein. Connector body 56 further includes an inner dividing wall 90 positioned axially between first bore 84 and second bore 86.

Connector 48 further includes a tube body 58 coaxially arranged with connector body 56 within second bore 86, and including a first axial tube body end 102 having a first sealing surface 106 structured to form a first seal 59 against inner dividing wall 90. Tube body 58 further includes a second axial tube body end 104 having a second sealing surface 108 structured to form a second seal 61 against housing 36 of accumulator 30. Connector 48 still further includes a high-pressure fluid passage 92, 110, that includes a first segment 92 formed in connector body 56 and a second segment 110 formed in tube body 58, for fluidly connecting fluid reservoir 68 with sensor mechanism 46 by way of passage 66, for example. First segment 92 extends through inner dividing wall 90 between first bore 84 and second bore 86. Second segment 110 extends between first axial tube body end 102 and second axial tube body end 104. Connector body 56 may also include a third sealing surface 96 on a first side of inner dividing wall 90, and a second sealing surface 94 on an opposite side of inner dividing wall 90. Each of sealing surface 94 and sealing surface 96 may extend circumferentially around center axis 100. Segment 92 of high pressure passage 92, 110 extends between sealing surface 94 and sealing surface 96. An annulus 77 may extend circumferentially around sealing surface 94. Sealing surface 94 may be substantially flat in shape, and sealing surface 96 may be conical in shape although the present disclosure is not thereby limited. In a practical implementation strategy, an inner surface 88 of bore 84 may be threaded so as to threadedly engage with sensing mechanism 46. As noted above, sensing mechanism 46 can include a pressure sensor and structured such that a sensing element 50 is exposed to fluid pressure of reservoir 68. Sensing mechanism 46 may form against inner dividing wall 90 to form seal 63.

Each of sealing surface 106 and sealing surface 108 may also extend circumferentially around center axis 100. Connector 48 still further includes a low-pressure space 98 structured to drain a fluid, such as fuel, leaked from high-pressure passage 92, 110, past either of first seal 59 or second seal 61. Low-pressure space 90 may fluidly connect with drain line 28. Low-pressure space 90 may have the form of a low-pressure passage, and is in fluid communication with each of bore 84 and bore 86. Similar low-pressure spaces may be defined by each of accumulators 30, although only a single one of accumulators 30 may be coupled with a sensor and connector assembly 44 in system 20 as described herein. In the illustrated embodiment, an annular cavity 120 extends circumferentially about tube body 58 at first axial tube body end 102, and low-pressure fluid space is in fluid communication with second bore 86 by way of annular cavity 120.

In a practical implementation strategy, at least one of a surface area, a diameter, or a surface angle relative to center axis 100 of first sealing surface 106 may be different than a corresponding surface area, diameter, or surface angle relative to center axis 100 of second sealing surface 108. It has been observed in a known design that rotating a connector into engagement with threads on a housing of a fluid reservoir can result in deformation of one or both of surfaces of the connector and surfaces of the housing that rotate against one another under relatively high axial forces. Those skilled in the art will be familiar with the desirability of relatively smooth and uniform sealing surface, particularly with metal-to-metal seals of the type commonly employed in systems such as high-pressure fuel system 20. Deformation in the sealing surface of the housing has the generally undesirable result of degrading seal performance, typically to the point that sealing is compromised and the deformed part must be replaced or separately serviced. According to the present disclosure, the different designs and/or surface properties of first sealing surface 106 and second sealing surface 108, as well as the surfaces with which they abut respectively, enables rotation of connector body 56 relative to tube body 58 to predominate rather than rotation of tube body 58 relative to housing 36. Another way to understand this principle is that upon engaging threads 82 of connector body 56 with threads 83 of housing 36, first sealing surface 106 rotates more easily against connector body 56 than second sealing surface 108 rotates against housing 36.

As alluded to above there are numerous ways in which the rotation can be biased to occur between connector body 56 and tube body 58 rather than between tube body 58 and housing 36. In one embodiment a diameter of first sealing surface 106 can be less than a diameter of second sealing surface 108. A surface area of sealing surface 108 could be made greater than a surface area of sealing surface 106 such that greater frictional interaction occurs at seal 61 rather than at seal 59. A surface angle of one of surfaces 106 and 108 relative to center axis 100 may be relative steeper than the surface angle of the other of surfaces 106 and 108. Those skilled in the art will appreciate that these and other factors can be varied in numerous different ways so that rotation of connector body 56 relative to tube body 58 has more of a tendency to occur than rotation of tube body 58 relative to housing 36. Each of sealing surfaces 106 and 108 may also have a spherical shape in certain embodiments. The surfaces against which sealing surfaces 106 and 108 abut can have conical shapes. In a further practical implementation strategy a spherical radius 112 defined by first sealing surface 106 may be larger than a spherical radius 114 defined by second sealing surface 108.

Figure 4:
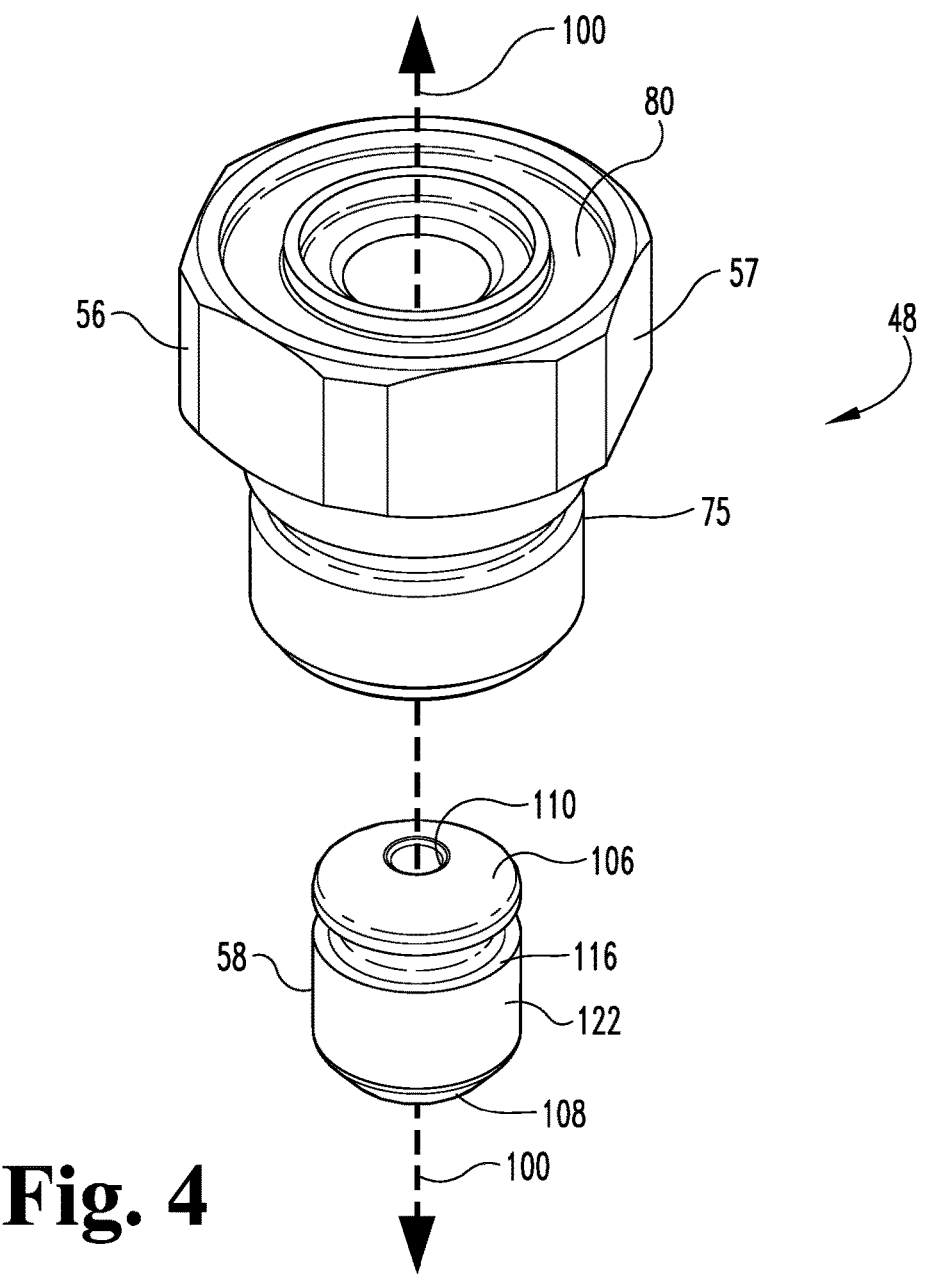
FIG. 4 is a disassembled view of the connector of FIG. 3.

Referring also to FIG. 4, there is shown a disassembled view of connector body 56 and tube body 58, and illustrating an annular groove 75 extending circumferentially around connector body 56. O-ring 75 can be received in groove 75. O-ring 54 may be received within another annular groove 80 that is formed within first axial connector body end 76. Yet another O-ring 118 may be provided as shown in FIG. 3 and seats within another annular groove 116 that extends circumferentially around tube body 58. It can be seen from FIG. 3 that O-ring 116 is positioned within annular groove 116 and also within annular cavity 120 to enable tube body 58 to be supported within second bore 86, typically for purposes of assembly. When tube body 58 is inserted into bore 86 O-ring 118 may be deformed slightly to enter annular cavity 120 such that tube body 58 will not fall out of bore 86.

INDUSTRIAL APPLICABILITY

Referring to the drawings generally, when it is desirable to couple a sensing mechanism such as mechanism 46 with fluid reservoir 68, connector 48 may be rotated relative to housing 36 to engage threads 82 with threads 83, causing connector 48 to be clamped to housing 36 by way of engagement of threads 82 with threads 83. As a result of the clamping tube body 58 forms first seal 59 against connector body 56 and forms second seal 61 against housing 36. At the same time a high-pressure fluid passageway by way of passage 92, 110 may be established to communicate a fluid pressure of fluid reservoir 68 to sensing mechanism 46. Mechanism 46 might or might not be coupled with connector body 56 during assembly to housing 36.

As described herein, during the clamping of connector 48 to housing 36 connector body 56 may be rotated against tube body 58. Tube body 48 may be limited from rotating against housing 36, potentially not rotating at all. As a result of the limiting of rotation of tube body 58 there will be little or substantially no deformation of the material of housing 36, meaning that housing 36 and connector body 56 can typically be reused after engine system 10 or fuel system 20 are remanufactured, or simply disassembled and reinstalled during the normal course of a service life.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

LIST OF ELEMENTS 10 engine system
12 engine 14 engine housing
16 cylinder head
18 cylinders
20 fuel system
22 fuel tank
24 transfer pump
25 high-pressure pump
26 common rail
28 low-pressure drain conduit
30 accumulator
32 fuel injector
34 segment
36 accumulator housing
38 high-pressure outlet
40 high-pressure inlet
42 low-pressure outlet
44 sensor and connector assembly
46 sensor
48 connector
50 sensing element
52 sensor housing
54 O-ring
56 connector body
57 outer surface
58 tube body
59 first seal
60 connector assembly
61 second seal
62 connector piece
63 third seal
64 connector piece
66 passage
68 reservoir
70 edge filter
72 refill control mechanism
74 O-ring
75 annulus
76 first axial connector body end
77 annulus
78 second axial connector body end
79 outlet
80 annular groove
82 threads
84 first bore
86 second bore
88 inner bore surface
90 wall
92 passage
94 first sealing surface
96 second sealing surface
98 drain passage
100 axis
102 first axial end
104 second axial end
106 first sealing surface
108 second sealing surface
110 passage
112 radius
114 radius
116 annular groove
118 O-ring
120 cavity
122 outer surface

What is claimed is:

1. A pressurized fluid system comprising:
a supply of pressurized fluid;
a common rail fluidly connected to the supply of pressurized fluid;
a plurality of fluid conduits each including a housing defining a fluid inlet in fluid communication with the common rail, a fluid outlet, and a fluid reservoir extending between the fluid inlet and the fluid outlet, and at least one of the housings having a first set of threads;
a connector including a connector body and a tube body positioned within the connector body, the connector body including a second set of threads engaged with the first set of threads such that the tube body is clamped between the connector body and the housing to form a first seal against the connector body and a second seal against the housing; and
a sensing mechanism coupled with the connector and forming a third seal with the connector body;
the connector further defining a high pressure fluid passage extending through the connector body and the tube body and fluidly connecting the corresponding fluid reservoir with the sensing mechanism, and a low pressure space structured to drain a fluid leaked from the high pressure passage past either of the first seal or the third seal.

2. The fluid system of claim 1 wherein each of the plurality of fluid conduits includes an accumulator, and further comprising a plurality of fluid delivery devices each coupled with one of the accumulators.

3. The fluid system of claim 2 comprising a fuel system wherein each of the plurality of fluid delivery devices includes a fuel injector.

4. The fluid system of claim 3 wherein the sensing mechanism includes a pressure sensor having a sensing element exposed to a fluid pressure of the high pressure passage.

5. The fluid system of claim 3 further comprising a common drain line in fluid communication with each of the plurality of fluid conduits.

6. The fluid system of claim 1 wherein the connector body defines a longitudinal center axis, and the tube body is coaxially arranged within the connector body and includes a first axial end having a first sealing surface formed thereon and extending circumferentially around the longitudinal center axis, and a second axial end having a second sealing surface formed thereon and extending circumferentially around the longitudinal center axis.

7. The fluid system of claim 6 wherein the tube body and the connector body are structured to rotate relative to one another at the first seal relatively more easily, and the tube body and the connector body are structured to rotate relative to one another at the second seal relatively less easily.

8. The fluid system of claim 7 wherein at least one of a surface area of contact, a diameter of contact, or an angle of contact between the tube body and the connector body at the first seal is different from a corresponding surface area of contact, diameter of contact, or angle of contact between the tube body and the housing at the second seal.

9. The fluid system of claim 8 wherein a diameter of the first seal is greater than a diameter of the second seal.

10. The fluid system of claim 1 wherein the connector body has each of a first bore and a second bore formed therein, and the sensing mechanism is positioned within the first bore and the tube body is positioned within the second bore, wherein the connector body further includes an internal dividing wall positioned axially between the first bore and the second bore, and wherein the high pressure passage extends through the internal dividing wall between the first bore and the second bore, and the low pressure space is in fluid communication with each of the first bore and the second bore.

11. A connector for mounting a sensor in a pressurized fluid system comprising:
a connector body defining a longitudinal center axis extending between a first axial connector body end having a first bore formed therein and a second axial connector body end having a second bore formed therein, and the connector body further including an internal dividing wall positioned axially between the first bore and the second bore, and a set of threads structured to engage another set of threads in a housing of a fluid reservoir for clamping the connector to the housing;
a tube body coaxially arranged with the connector body within the second bore, and including a first axial tube body end having a first sealing surface structured to form a first seal against the internal dividing wall, and a second axial tube body end having a second sealing surface structured to form a second seal against the housing of the fluid reservoir;
a high pressure fluid passage for fluidly connecting the fluid reservoir with a sensor mechanism positioned within the first bore, and including a first segment formed in the connector body and extending through the inner dividing wall between the first bore and the second bore, and a second segment formed in the tube body and extending between the first axial tube body end and the second axial tube body end; and
a low pressure fluid space formed in the connector body and in fluid communication with each of the first bore and the second bore, for draining a fluid leaked from the high pressure fluid passage.

12. The connector of claim 11 wherein at least one of a surface area, a diameter, or a surface angle of the first sealing surface is different than a corresponding surface area, diameter, or surface angle of the second sealing surface, such that upon engaging the set of threads of the connector body with the set of threads of the housing the first sealing surface rotates more easily against the connector body than the second sealing surface rotates against the housing.

13. The connector of claim 12 wherein a diameter of the first sealing surface is less than a diameter of the second sealing surface.

14. The connector of claim 13 wherein each of the first sealing surface and the second sealing surface has a spherical shape.

15. The connector of claim 14 wherein a spherical radius defined by the first sealing surface is larger than a spherical radius defined by the second sealing surface.

16. The connector of claim 12 wherein the second bore includes an annular cavity extending circumferentially about the tube body at the first axial tube body end, and the low pressure fluid space is in fluid communication with the second bore by way of the annular cavity.

17. The connector of claim 16 wherein the tube body has an annular groove formed therein, and further comprising an O-ring positioned within the annular groove and within the annular cavity such that the tube body is supported within the second bore.

18. The connector of claim 12 wherein the connector body further includes a third sealing surface located on a first axial side of the internal dividing wall and structured to seal against a sensing mechanism positioned within the first bore, and a fourth sealing surface located on a second axial side of the internal dividing wall and structured to seal against the first sealing surface of the tube body.

19. The connector of claim 18 wherein each of the third sealing surface and the fourth sealing surface extends circumferentially around the longitudinal center axis, and the segment of the high pressure passage within the internal dividing wall extends between the first sealing surface and the second sealing surface.

20. A method of coupling a sensing mechanism with a fluid reservoir in a pressurized fluid system comprising:
rotating a connector for mounting the sensing mechanism relative to a housing of the fluid reservoir to engage a set of threads of a connector body of the connector with a set of threads of the housing;
clamping the connector to the housing by way of the engagement of the sets of threads, such that a tube body of the connector forms a first seal against the connector body and a second seal against the housing and establishes a fluid passage for communicating a fluid pressure of the fluid reservoir to the sensing mechanism;
rotating the connector body against the tube body during the clamping so as to limit rotation of the tube body against the housing; and
limiting deformation of the housing caused by the clamping by way of the limiting of rotation of the tube body.

* * * * *